US011322062B1

(12) United States Patent
Hershey et al.

(10) Patent No.: US 11,322,062 B1
(45) Date of Patent: May 3, 2022

(54) DUAL DISPLAY DEVICE CONTROL

(71) Applicant: Microsoft Technology Licensing, LLC, Redmond, WA (US)

(72) Inventors: Kyle William Hershey, Seattle, WA (US); Samu Matias Kallio, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/215,645

(22) Filed: Mar. 29, 2021

Related U.S. Application Data

(60) Provisional application No. 63/134,501, filed on Jan. 6, 2021.

(51) Int. Cl.
| | | |
|---|---|---|
| G09G 5/10 | (2006.01) | |
| G09G 3/00 | (2006.01) | |
| G06F 3/14 | (2006.01) | |

(52) U.S. Cl.
CPC ............ G09G 3/035 (2020.08); G06F 3/1431 (2013.01); G09G 5/10 (2013.01); *G09G 2320/0686* (2013.01); *G09G 2380/02* (2013.01)

(58) Field of Classification Search
CPC ...... G09G 3/035; G09G 5/10; G09G 2380/02; G09G 2320/0686; G06F 3/1431
See application file for complete search history.

(56) References Cited

U.S. PATENT DOCUMENTS

| | | | | |
|---|---|---|---|---|
| 5,782,642 | A  * | 7/1998 | Goren | G09B 5/00 345/2.1 |
| 6,229,502 | B1 * | 5/2001 | Schwab | G06F 15/0291 345/1.1 |
| 8,358,317 | B2 | 1/2013 | Carlson | |
| 9,570,042 | B2 * | 2/2017 | Jeong | G09G 3/3233 |
| 9,639,177 | B2 * | 5/2017 | Kim | G09G 5/003 |
| 9,811,507 | B2 * | 11/2017 | Cranfill | G06F 3/0488 |
| 9,858,848 | B1 | 1/2018 | Bhageria et al. | |
| 10,185,064 | B2 * | 1/2019 | Powell | G06F 1/1641 |
| 10,223,952 | B2 * | 3/2019 | Powell | G09G 3/02 |
| 10,235,916 | B2 | 3/2019 | Park et al. | |
| 10,657,912 | B2 | 5/2020 | Jin et al. | |
| 11,068,225 | B2 * | 7/2021 | Huang | G06F 3/1431 |

(Continued)

FOREIGN PATENT DOCUMENTS

| | | |
|---|---|---|
| CN | 108196810 A | 6/2018 |
| WO | 2014109445 A1 | 7/2014 |

OTHER PUBLICATIONS

How to adjust full screen color balance of display for Samsung Mobile Device?, Retrieved from: https://www.samsung.com/sg/support/mobile-devices/how-to-adjust-full-screen-color-balance-of-display-for-samsung-mobile-device/, Retrieved Date: Dec. 18, 2020, 14 Pages.

(Continued)

*Primary Examiner* — Rodney Amadiz
(74) *Attorney, Agent, or Firm* — Rainier Patents, P.S.

(57) ABSTRACT

The description relates to hinged devices, such as hinged computing devices. One example can receive content data relating to a pair of displays that are rotatable around a hinge axis and that include curved regions proximate to the hinge axis. The example can generate a frame rendering for the content data that progressively dims the curved regions of the displays with decreasing distance from hinge axis.

20 Claims, 10 Drawing Sheets

(56) References Cited

U.S. PATENT DOCUMENTS

| | | | |
|---|---|---|---|
| 2007/0154876 A1* | 7/2007 | Harrison | G09B 5/06 |
| | | | 434/365 |
| 2011/0109535 A1* | 5/2011 | Watanabe | G02F 1/133526 |
| | | | 345/87 |
| 2016/0034047 A1 | 2/2016 | Lee et al. | |
| 2016/0093240 A1* | 3/2016 | Aurongzeb | G09G 3/3225 |
| | | | 345/590 |
| 2019/0138179 A1* | 5/2019 | Xia | G06F 1/1643 |
| 2019/0206363 A1* | 7/2019 | Yang | G09G 5/10 |
| 2019/0304404 A1 | 10/2019 | Lin et al. | |
| 2020/0251048 A1* | 8/2020 | Im | H01L 27/156 |
| 2020/0319673 A1 | 10/2020 | Lee et al. | |

OTHER PUBLICATIONS

"International Search Report and Written Opinion issued in PCT Application No. PCT/US21/057553", dated Feb. 13, 2022, 16 Pages.

\* cited by examiner

DUAL DISPLAY DEVICE CONTROL

PRIORITY

This U.S. utility patent application claim priority to U.S. Provisional Patent Application 63/134,501, filed on Jan. 6, 2021, which is hereby incorporated by reference in its entirety.

BACKGROUND

Curved display areas cause perceived color and/or intensity changes. These issues can be compounded on devices employing multiple curved displays. The present concepts can address these and other issues to provide an enhanced user experience.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown. To avoid clutter on the drawing page, in some FIGS., not every instance of every element is specifically designated.

DESCRIPTION

The present concepts relate to devices, such as computing devices employing dual displays. Example devices can include a first portion rotatably secured through a range of rotation to a second portion, such as by a hinge assembly. A first display can be positioned on the first portion and a second display can be positioned on the second portion. Inside edges of the displays may be curved or rounded proximate to the hinge assembly to prevent the displays from contacting and damaging one another, to reduce hinge radius, and/or for aesthetic reasons. Content can be displayed on the first and second displays for consumption by a user of the device. However, content on the curved edges has a different viewing angle relative to the user than the remainder of the displays. Traditionally, this scenario resulted in brightness reduction and color change which created a reduced user experience. However, the present concepts can control the curved portions of the displays utilizing techniques that enhance rather than diminish the user experience. In some cases, the curved edges can be controlled to mimic or simulate the curved edges of a physical book where the pages curve into the spine.

Figure 1:
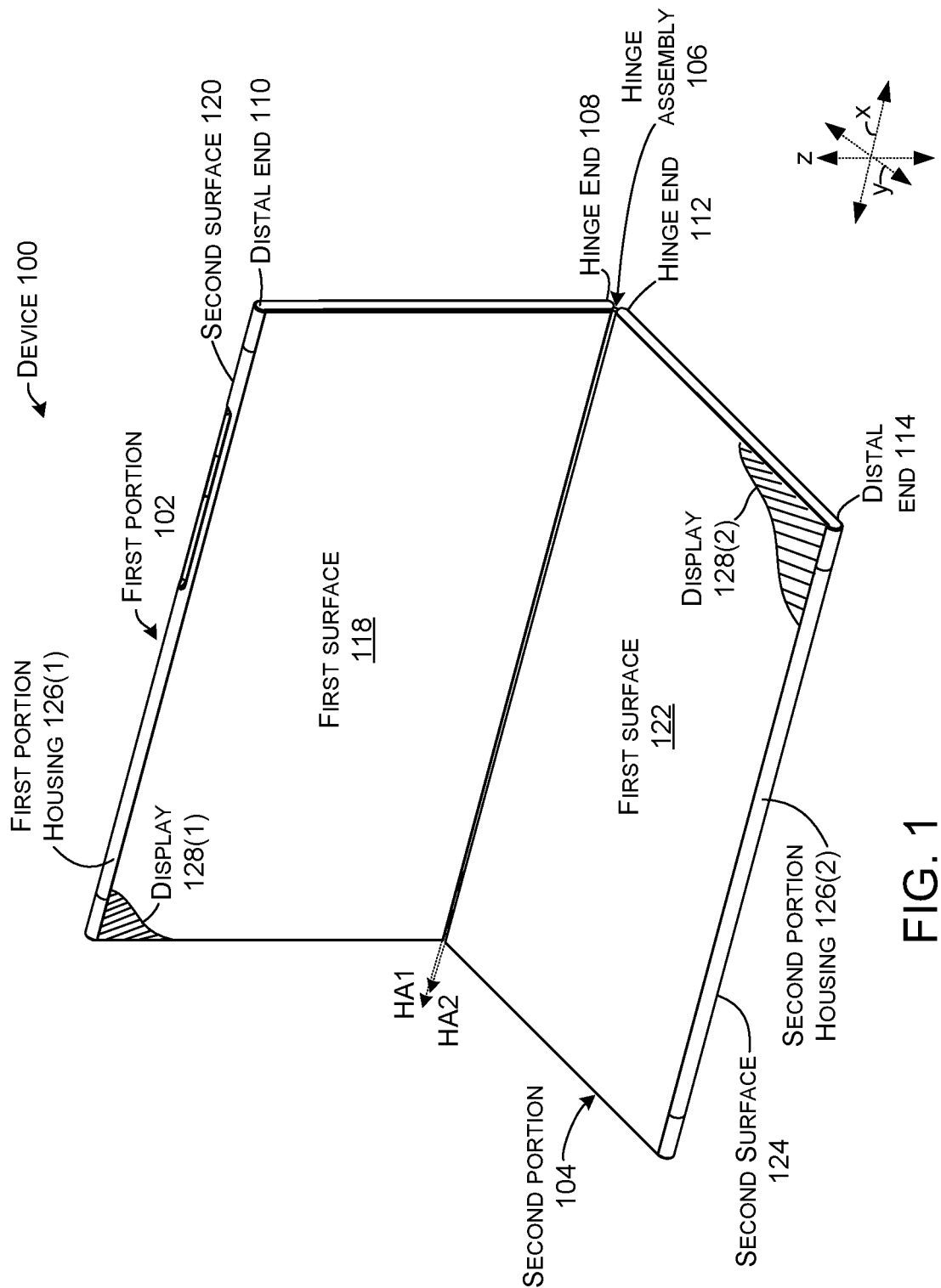
FIG. 1 shows a perspective view of an example device in accordance with some implementations of the present concepts.

Introductory FIG. 1 shows an example device 100 that has first and second portions 102 and 104 that are rotatably secured together by a hinge assembly 106. The hinge assembly can allow the first and second portions to rotate through a range of rotations, such as zero degrees to 180 degrees or zero degrees to 360 degrees for example. Various types of hinge assemblies 106 can be employed that cause the first and second portions 102 and 104 to rotate around one or more hinge axes. In the illustrated configuration, hinge assembly 106 defines two hinge axes (HA). First portion 102 rotates around the first hinge axis (HA1) and the second portion 104 rotates around the second hinge axis (HA2). Further, the hinge assembly may cause synchronized rotation around the two hinge axes. For instance, 20 degrees of rotation of the first portion 102 around HA1 is accompanied by 20 degrees of simultaneous rotation of the second portion around HA2. Other implementations may not include the synchronizing aspect.

The first portion 102 can extend from a hinge end 108 to a distal end 110. The second portion 104 also can extend from a hinge end 112 to a distal end 114. The first portion 102 can include opposing first and second major planar surfaces 118 and 120 (hereinafter, first and second surfaces). Similarly, the second portion 104 can include opposing first and second major planar surfaces 122 and 124 (hereinafter, first and second surfaces). (Note the second surfaces 120 and 124 are facing away from the viewer and as such are not directly visible in this view).

In some implementations, the first portion 102 can include a first housing (e.g., first portion housing 126(1)) and the second portion 104 can include a second housing (e.g., second portion housing 126(2)). In this case, displays 128 are positioned on the first surfaces 118 and 122, respectively. In the illustrated example, display 128(1) is positioned on first portion housing 126(1) and display 128(2) is positioned on second portion housing 126(2). In other examples, the displays 128 can be positioned on the first and/or second surfaces 118, 120, 122, and/or 124, respectively.

The displays 128 can be controlled based upon visual data to present visual content to the user. This aspect will be described in more detail below relative to FIG. 3. Users can consume the visual content at various orientations of the first and second portions, such as the 90-degree orientation shown here. A common orientation for visual consumption is with the device portions arranged at a 100-180-degree orientation and positioned in front of the user to mimic a physical printed book. This aspect is discussed below relative to FIGS. 2A-2C.

Figure 2A:
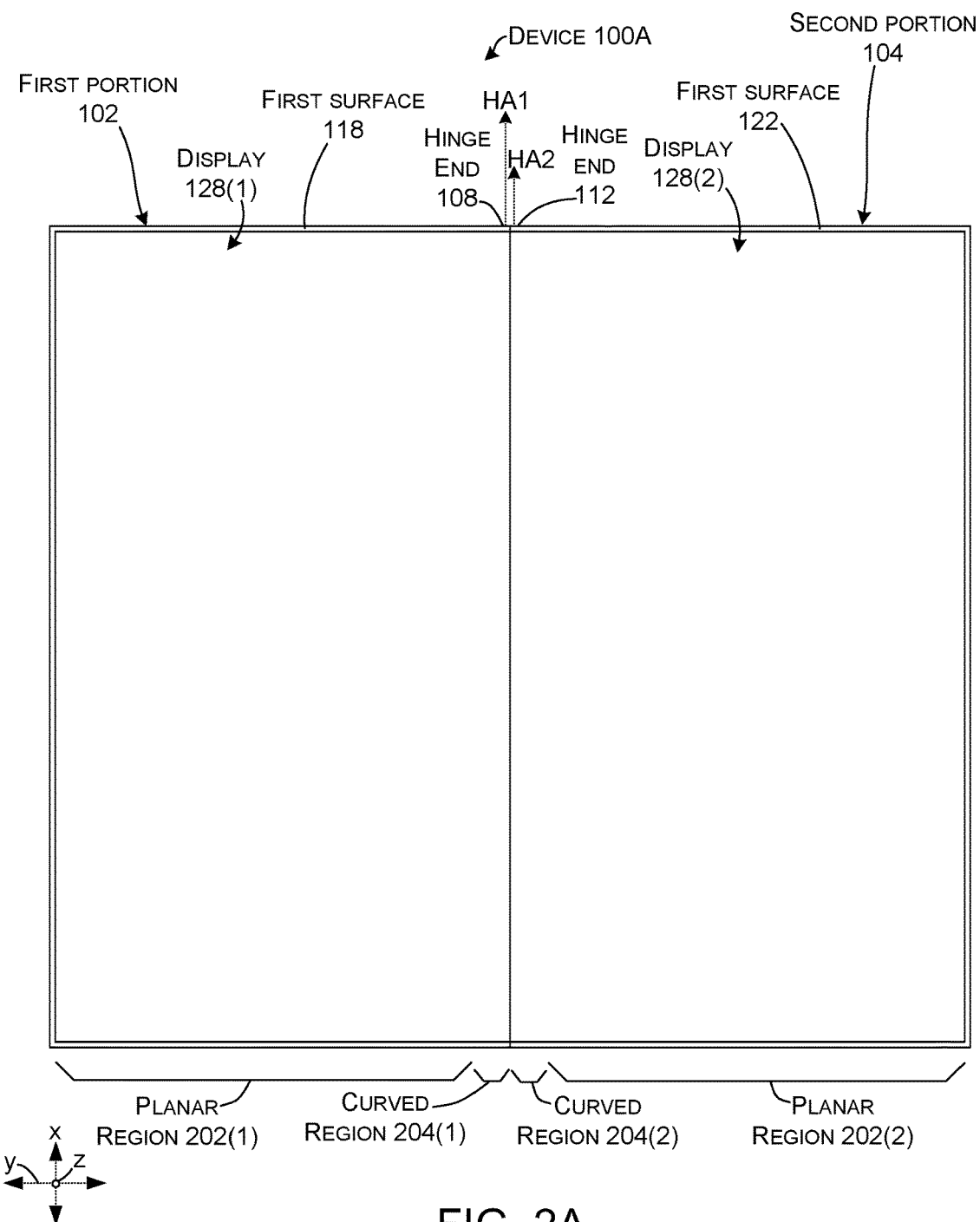
FIGS. 2A-2C, 3A-3D, and 4 show elevational views of example devices in accordance with some implementations of the present concepts.
Figure 2B:
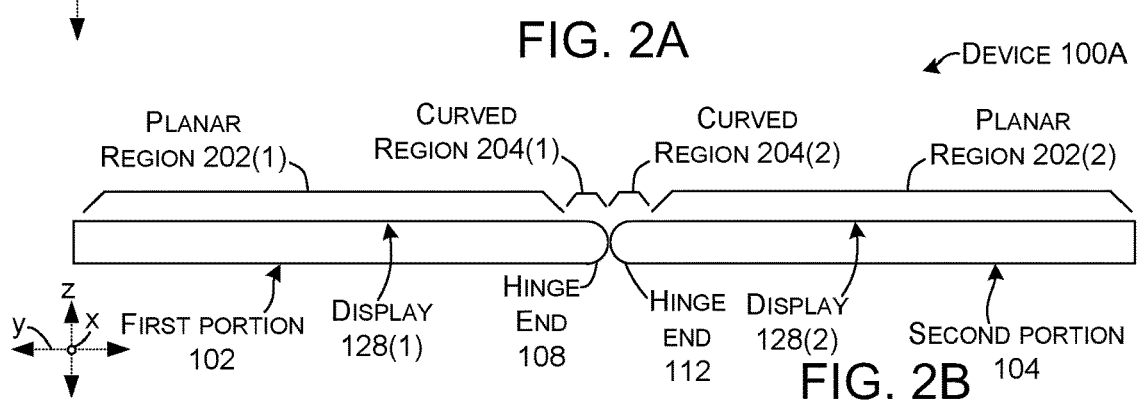
Figure 2C:
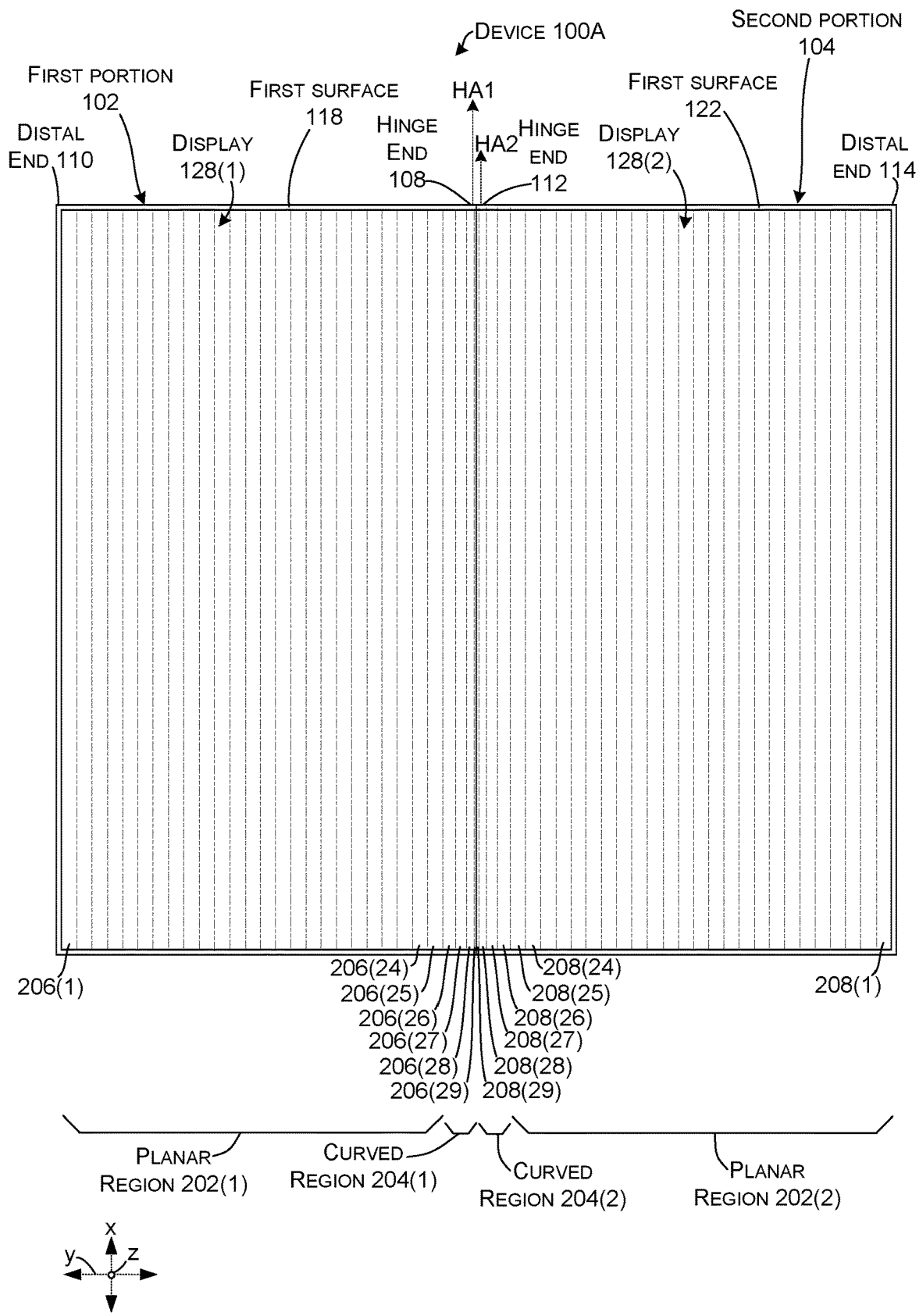

FIGS. 2A-2C collectively show another example device 100A. FIGS. 2A and 2C show the device in a 180-degree orientation (e.g., 'book') view. FIG. 2B shows a view of device in the 180-degree orientation taken along the hinge axes. In this case, the displays 128 extend across first surfaces 118 and 122. The displays 128 can include generally planar regions 202 that transition to curved regions 204 at the hinge ends 108 and 112 of the first and second portions 102 and 104, respectively. In this orientation, the planar regions 202 are coplanar with one another.

FIG. 2C shows that the displays 128(1) and 128(2) can be addressed in multiple vertical columns 206 and 208, respectively to generate visual content for the user. The columns can run parallel to the hinge axes. For ease of explanation, 29 columns are illustrated in this example. In many implementations, the number of columns is in the hundreds or thousands. The explanation applies regardless of the number of columns. To avoid clutter on the drawing page, columns 206(2)-206(23) and 208(2)-208(23) are shown, but not designated. Note that columns 206(1)-206(25) and 208(1)-208(25) are in the planar regions 202, while columns 206(26)-206(29) and 208(26)-208(29) are in the curved regions 204.

Traditionally, content has been presented uniformly across the displays 128 (e.g., without recognizing issues caused by the curved regions 204 of the displays). The content presented on the curved regions tended to be degraded from the perspective of a user. For instance, the intensity and/or color of the content as perceived by the user does not match the content data (e.g., the intended image). The present implementations solve this technical problem by controlling the curved regions 204 of the displays 128 differently than the planar regions 202. Some of the present techniques for controlling the curved regions can entail controlling the curved regions so that content presented on the curved regions of the displays mimic the perceived content on physical pages of a book where they curve into the spine.

Thus, the present techniques can convert scenarios that traditionally resulted in a degraded user experience into an aesthetically pleasing scenario. The present concepts can provide a technical solution of controlling displays to reduce image degradation and providing enhanced user experiences. Further, rather than trying to fix the perceived degradation of the image from the curved regions, some of these techniques can involve controlling the display at the curved region to mimic physical pages of a book. Stated another way, the curved regions can be controlled to simulate the appearance of content on pages of a physical book where the pages curve into the spine through controlling brightness and color of the content.

Controlling the content presentation on the curved regions can reduce off-color and misdirected light from the curved regions that would otherwise reach the user's eyes and diminish the overall image quality. Recall that the curved regions are in the center of the device. Human eyes can distinguish millions of colors. Having off-color and/or improper brightness light emitted from the center of an image is especially distractive to the user perceived image at least because the user's foveal region tends to be aligned with the center of the image. The present concepts offer a technical solution to reduce and potentially eliminate this off-color and improper brightness light from the center of the image and thereby enhance the overall image and the overall viewing experience.

Figure 3A:
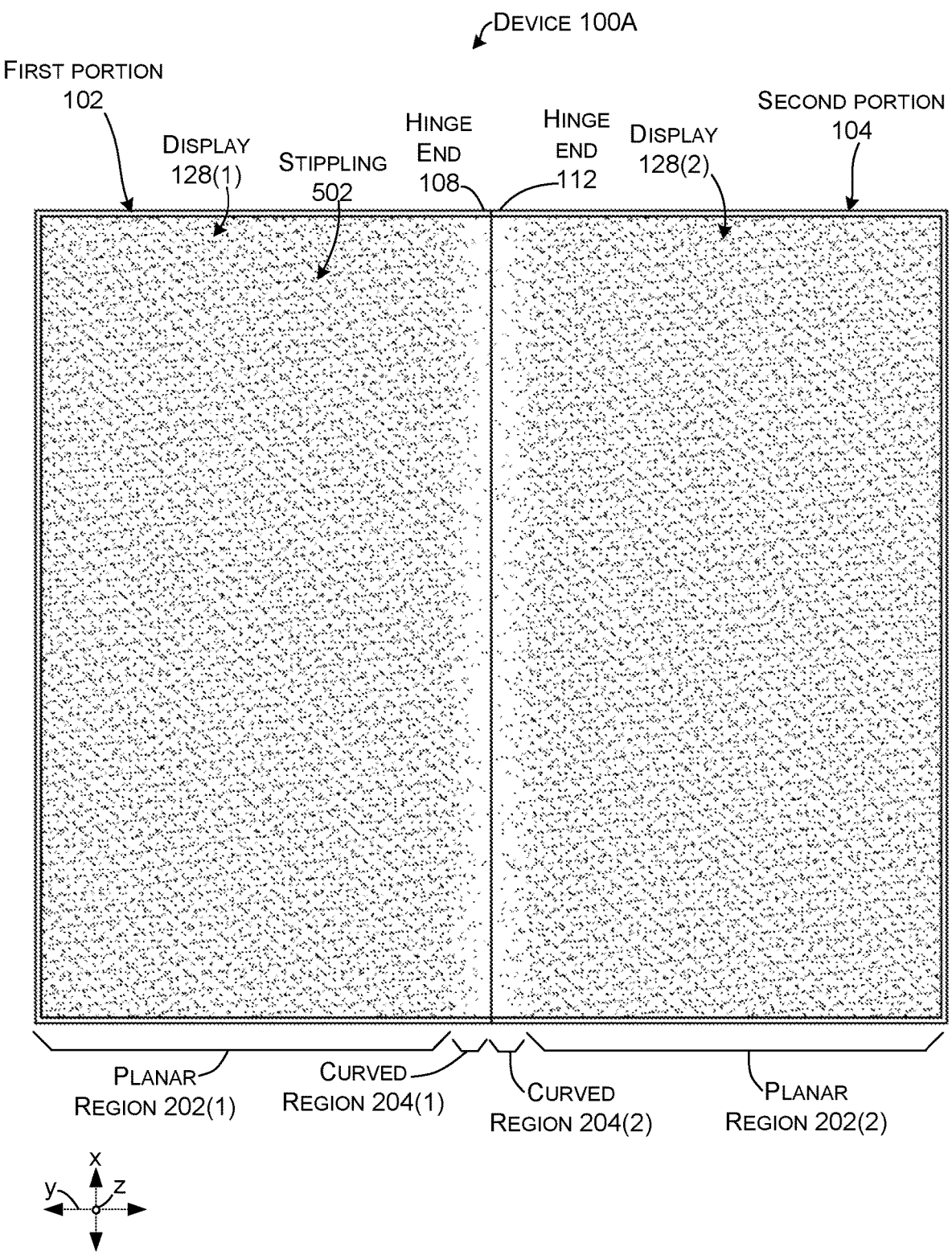
Figure 3B:
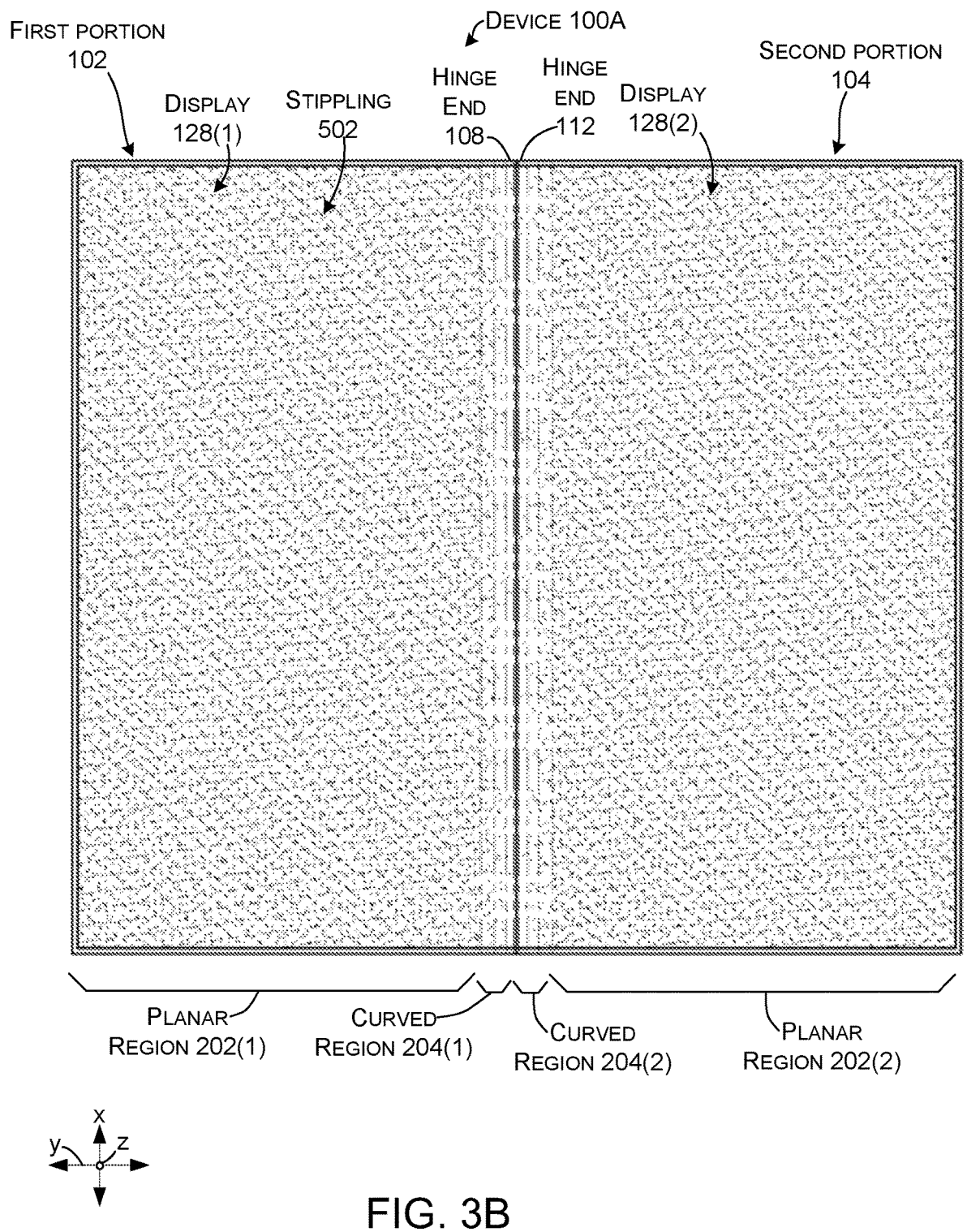

FIGS. 3A-3D and FIG. 4 collectively show device 100A employing example display control techniques. For purposes of explanation, assume that content is intended to be presented collectively across both displays 128(1) and 128(2). For ease of explanation assume that the content as defined by the content data is of uniform intensity and color across the intended image. FIGS. 3A and 3B utilize stippling 502 to represent image intensity. FIG. 3B indicates columns 206(26)-206(29) and 208(26)-208(29) of curved regions 204, but is otherwise identical to FIG. 3A. FIGS. 3A and 3B show that rather than being uniform, the present control techniques produce decreased image intensity in the curved regions 204 when compared to the planar regions 202. Further, the image intensity can be progressively decreased (e.g., dimmed) toward the hinge ends 108 and 112 of the device 100A.

Figure 3C:
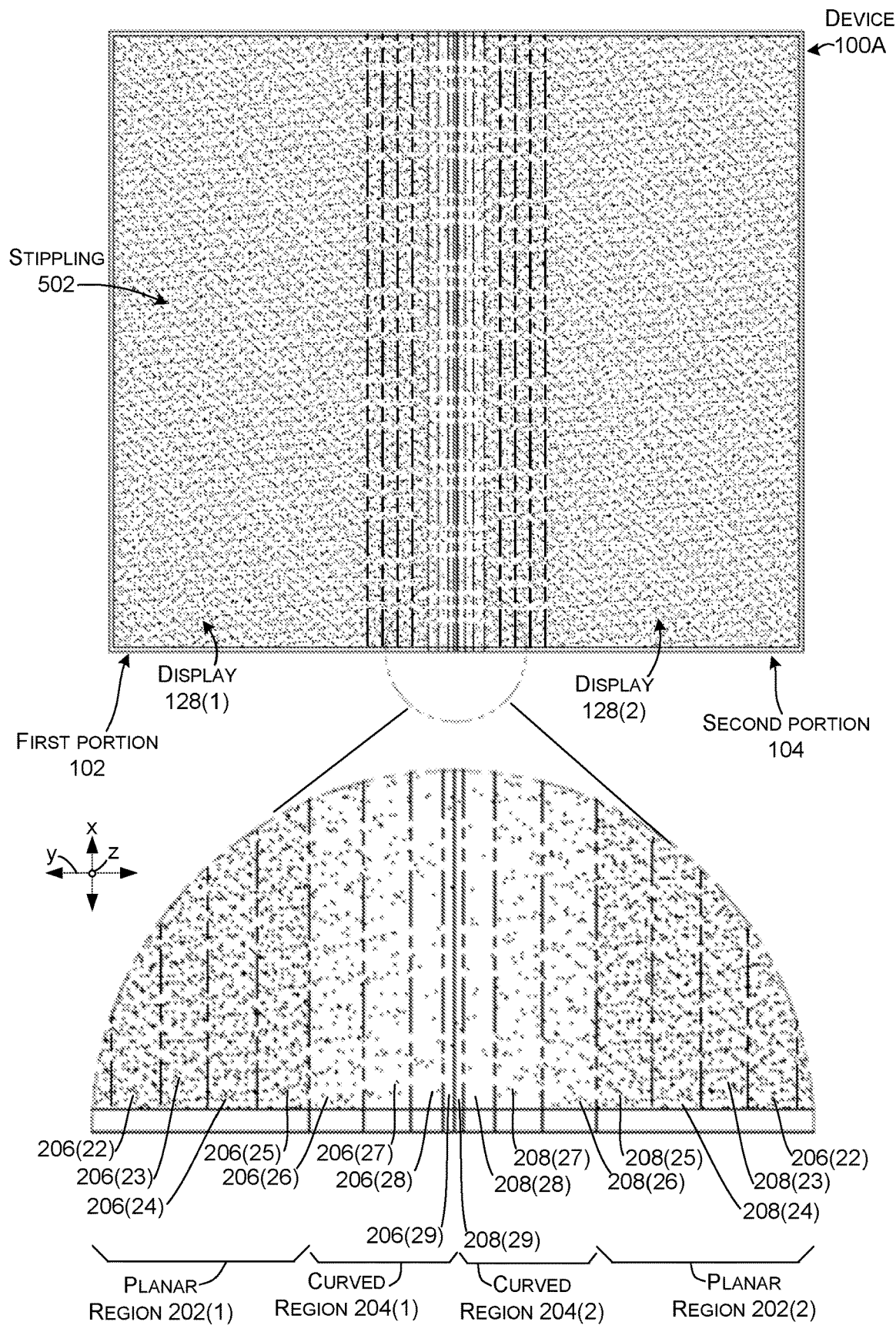
Figure 3D:
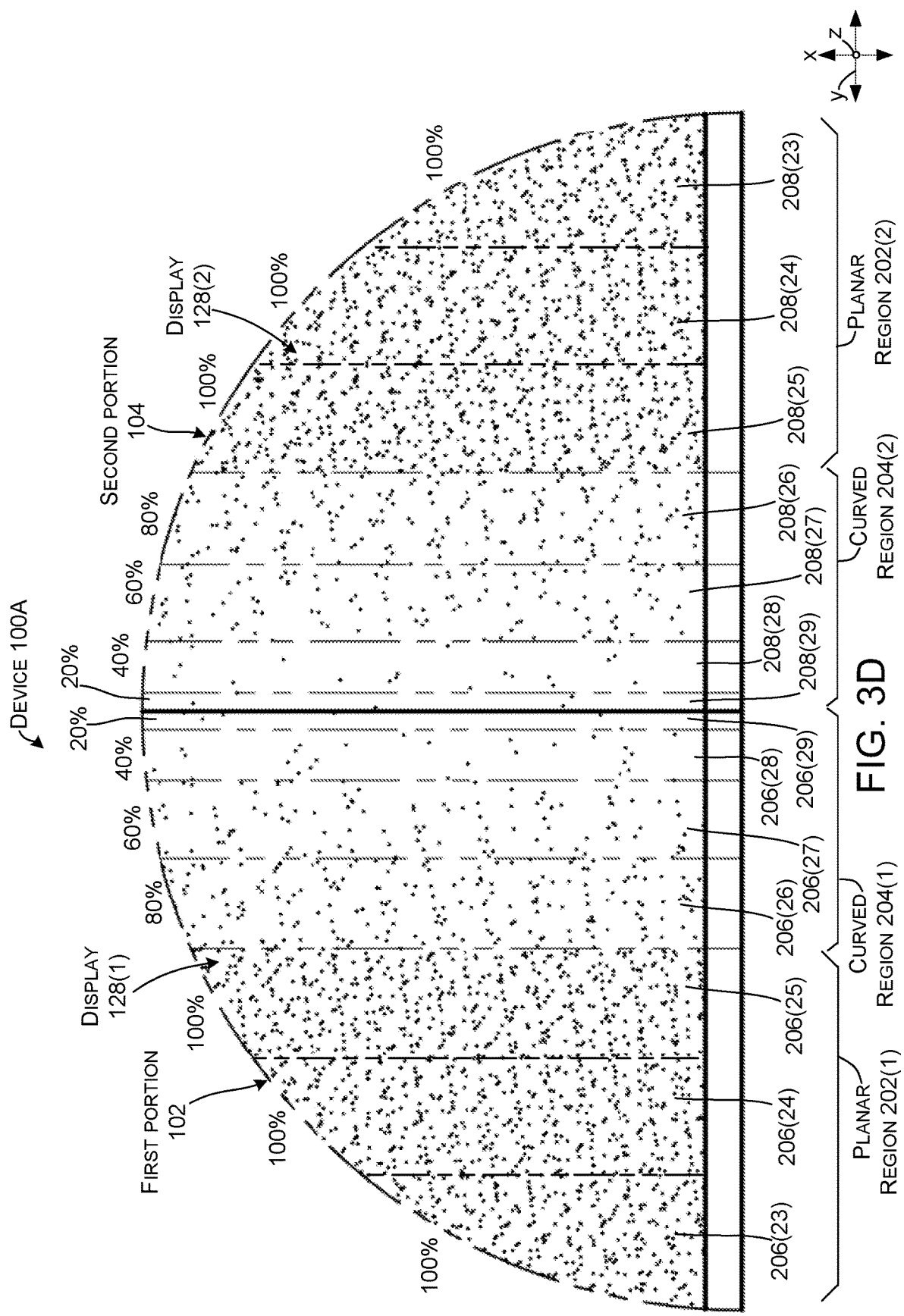

FIG. 3C is similar to FIG. 3B and shows an enlarged area of the device 100A. FIGS. 3C and 3D show an example of how the present techniques can progressively reduce image intensity for each column in curved regions 204. In this configuration, the rate of progressive dimming in the curved regions is constant (e.g., an additional 20% dimming per column 206 and 208). Thus, columns 206(26) and 208(26), which are proximate to the planar regions 202 and distal from the hinge assembly are dimmed 20% from the intensity defined in the content data (e.g., driven at 80% of the value that would correspond to the content data). Each proceeding column toward the hinge assembly is decreased another 20%, culminating at columns 206(29) and 208(29), which are dimmed by 80% (e.g., powered at 20%). The percentage values used here are provided for purposes of explanation and other percentage values are contemplated. As mentioned, in this example, the rate of progressive dimming is constant. An alternative configuration is described below.

Figure 4:
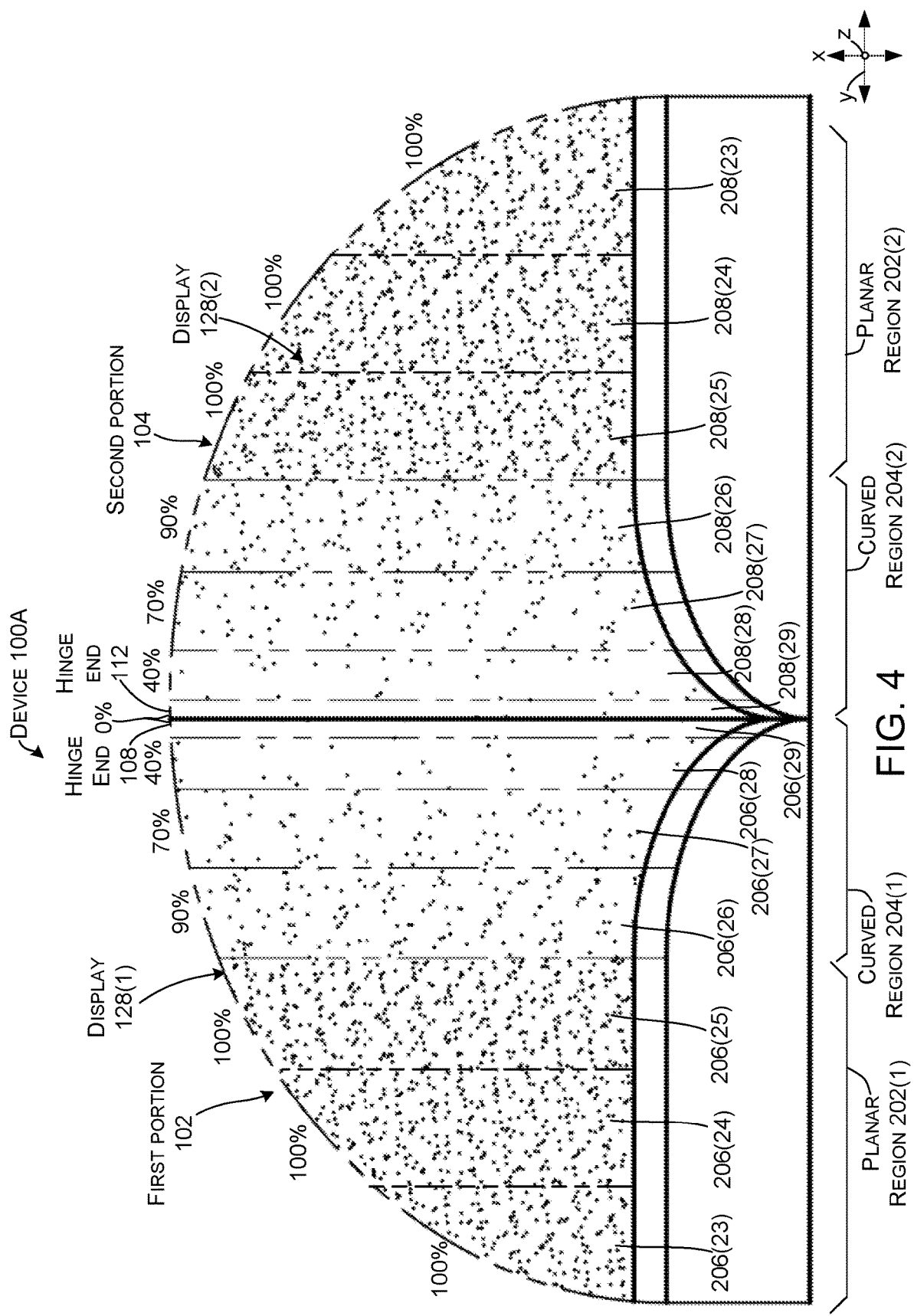

FIG. 4 shows another example where the rate of progressive dimming accelerates toward the hinge assembly (e.g., toward the hinge ends 108 and 112). In this case, columns 206(26) and 208(26), which are proximate to the planar regions 202 and distal from the hinge assembly are dimmed 10% from the intensity defined in the content data (e.g., driven at 90% of the value that would correspond to the content data). Columns 206(27) and 208(27) are dimmed 30%. Columns 206(28) and 208(28) are dimmed 60%. Columns 206(29) and 208(29), which are proximate to the hinge assembly (e.g., at the hinge ends 108 and 112) are dimmed 100%. Non-uniform progressive dimming may closely mimic the pages of a physical book in that the rate of change of the pages as they transition from horizontal to vertical (e.g., from being parallel to the cover of the book to being perpendicular to the cover of the book when they enter the spine) increases as they approach the spine. Non-uniform progressive dimming can simulate this changing rate of curvature.

Whether progressive dimming is uniform or non-uniform, the present dimming of curved regions of the display offers a technical solution of decreasing energy consumption to power the display while simultaneously providing an overall higher image resolution. The energy consumption is lower because the curved portions of the display are driven at a lower power than they otherwise would be. The image resolution is higher overall because the center of the image has less or no off-color and/or off brightness light. Thus, from a technical perspective, employing the current dimming concepts can cause the perceived image to be closer to the intended image than would otherwise be the case if the displays were controlled uniformly.

The percentage values used in the above examples are provided for purposes of explanation and other percentage values are contemplated. Further, while progressive dimming is explained in these examples relative to percentages of specified illumination intensity, other formulas and/or techniques are contemplated.

Figure 5:
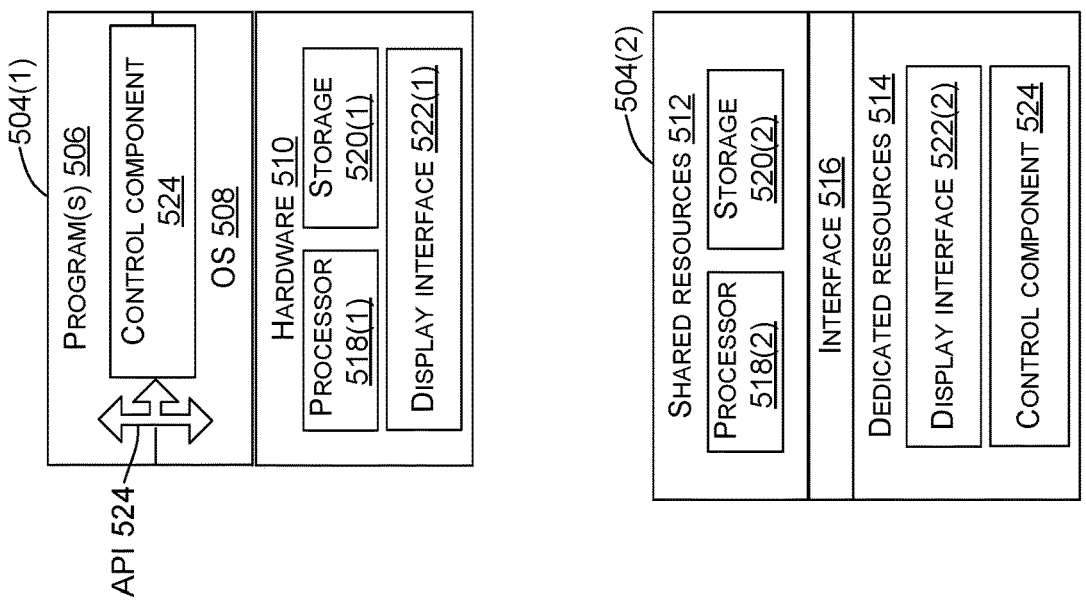
FIG. 5 shows an example system in accordance with some implementations of the present concepts.
Figure 5:
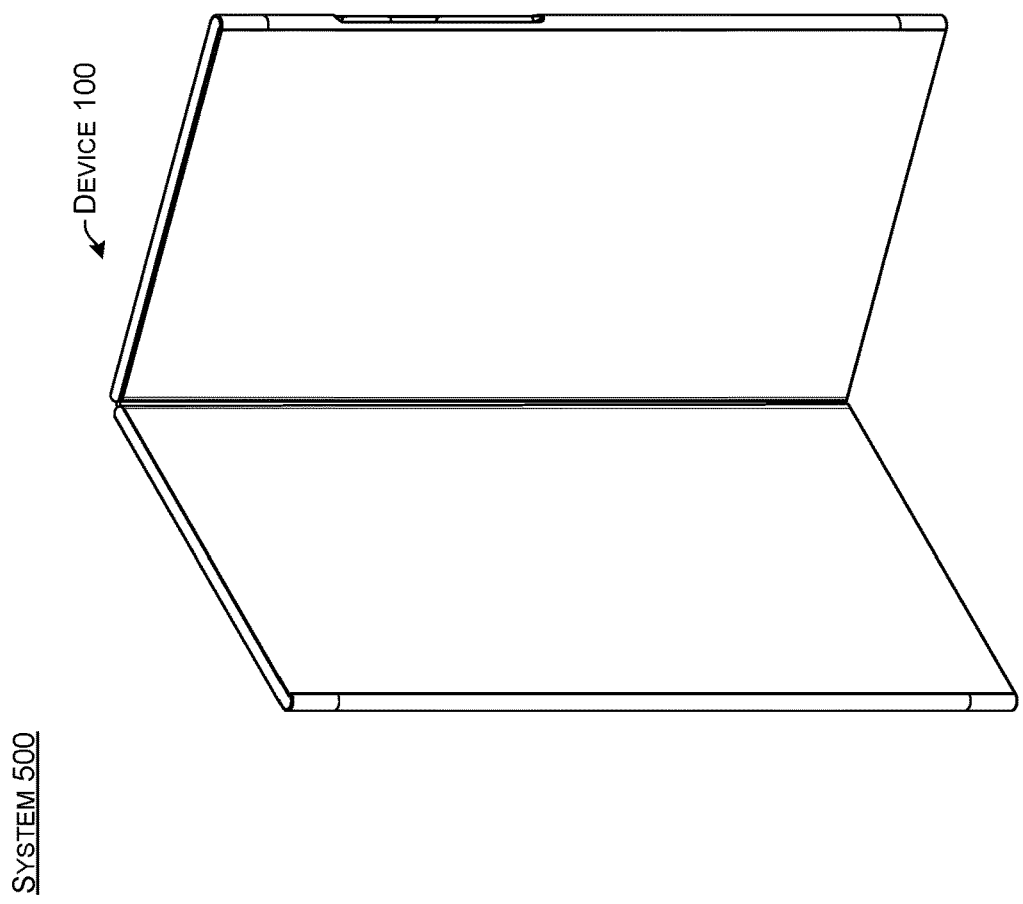

FIG. 5 illustrates an example system 500 that relates to various devices, such as device 100. While specific device configurations are illustrated, the system can relate to any device that has two or more screens that are rotatable relative to one another.

Individual devices 100 can be manifest as one of two illustrated configurations 504(1) and 504(2), among others. Briefly, configuration 504(1) represents an operating system centric configuration and configuration 504(2) represents a system on a chip configuration. Configuration 504(1) is organized into one or more applications or programs 506, operating system 508, and hardware 510. Configuration 504(2) is organized into shared resources 512, dedicated resources 514, and an interface 516 there between.

In either configuration, the devices 100 can include a processor 518, storage/memory (e.g., computer-readable storage media) 520, and a display interface 522. The display interface can include and/or be associated with a control component 524 configured to progressively reduce pixel intensity of the curved regions toward the hinge assembly. For instance, the control component 524 can include a display driver integrated circuit. The display driver integrated circuit can employ various techniques to determine an extent of dimming for pixels of the curved regions of the displays. In one example explained above relative to FIG. 2C, columns of pixels are managed together relative to dimming. Some implementations can employ or access a mapping table that maps pixels to a degree of dimming. The control component 524 can utilize values from the mapping table when powering the pixels in relation to content data. In some configurations the control component 524 can generate frame renderings that include dimming adjustments for the curved regions. The adjusted frame renderings can cause the rendering to accurately reflect the content data, except for the curved regions. The curved regions can be progressively dimmed to mimic physical pages of a book approaching the spine.

In configuration 504(1), the device 100 may include an instance of processor 518, storage 520, display interface 522, and/or control component 524. The device 100 can receive content data and process the content data into frame renderings that progressively adjust lumination intensities (e.g., dim pixels) on the curved regions. In one operating system centric configuration 504(1), the control component 524 can be embedded in program 506 and/or operating system 508.

In an alternative implementation, device 100 could include configuration 504(2) and can be viewed as a system on a chip (SOC) type design, such as an application specific integrated circuit (ASIC) that includes control component 524. Other device implementations, can include a processor 518, such as a CPU and/or GPU, that is communicatively coupled to the displays. The processor can receive image data and render frames (e.g., drive or power the displays consistent with the frame renderings) and can also execute the control component 524 on the same processor or on another processor. The control component can contribute to rendering the frames and/or adjusting the rendered frames to reflect the image data but with dimming of pixels on the curved regions.

As mentioned above, configuration 504(2) can be viewed as a system on a chip (SOC) type design. In such a case, functionality provided by the device can be integrated on a single SOC or multiple coupled SOCs. One or more processors 518(2) can be configured to coordinate with shared resources 512, such as memory, storage 520(2), etc., and/or one or more dedicated resources 514, such as hardware blocks configured to perform certain specific functionality. Thus, the term "processor" as used herein can also refer to central processing units (CPUs), graphical processing units (GPUs), controllers, microcontrollers, processor cores, or other types of processing devices. The control component 524 can be manifest as dedicated resources 514 and/or as shared resources 512.

One example SOC implementation can be manifest as an application specific integrated circuit (ASIC), a field programmable gate array (FPGA), and/or other circuitry. The ASIC/FPGA/circuitry can include the control component 524. For example, the ASIC/FPGA/circuitry can include logic gates and memory or may be a microprocessor executing instructions to accomplish the functionality associated with the control component 524, such as the functionality described below relative to FIG. 6. For instance, the ASIC/FPGA/circuitry can be configured to convert image data into frame renderings for multiple pixels. The ASIC/FPGA/circuitry can alternatively or additionally be configured to receive a frame rendering and to generate an adjusted frame rendering that progressively dims individual pixels of the curved regions depending on their proximity to the hinge edge of the display. This can create a decreasing pixel gain gradient approaching the edge of the displays where they abut one another at the hinge assembly.

From one perspective, any of devices 100 can be viewed as computers. The term "device," "computer," or "computing device" as used herein can mean any type of device that has some amount of processing capability and/or storage capability. Processing capability can be provided by one or more processors that can execute data in the form of computer-readable instructions (e.g., computer-executable instructions) to provide a functionality. Data, such as computer-readable instructions and/or user-related data, such as content data, can be stored on storage, such as storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

Generally, any of the functions described herein can be implemented using software, firmware, hardware (e.g., fixed-logic circuitry), or a combination of these implementations. The term "component" as used herein generally represents software, firmware, hardware, circuitry, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

METHOD EXAMPLES

Figure 6:
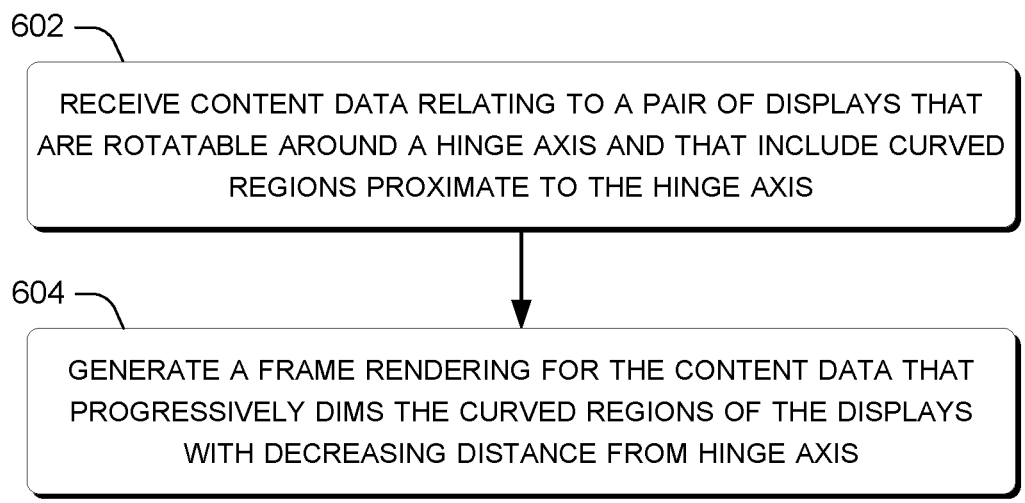
FIG. 6 shows an example flow chart of a device implemented method in accordance with some implementations of the present concepts.

FIG. 6 shows an example computer implemented method or process 600. In this case, block 602 can receive content data relating to a pair of displays that are rotatable around a hinge axis and that include curved regions proximate to the hinge axis. In some cases, the content data can define an intended graphical user interface (GUI) for presentation on the displays. The content data can relate to a first image for the first display and a second image for the second display. Alternatively, the content data can relate to an image that is collectively presented across the first and second displays. Other variations are contemplated.

Block 604 can generate a frame rendering for the content data that progressively dims the curved regions of the displays with decreasing distance from the hinge axis. Thus, the frame rendering can create the GUI that accurately reflects the content data except on the curved regions. On the curved regions, the GUI can mimic how content on pages of a physical book appear as the pages curve toward the spine. For instance, pixels on the curved regions that are closer to the planar regions of the display (e.g., farther from the hinge side edge of the display) can be dimmed a first amount. Pixels on the curved regions that are intermediate between the planar region and the hinge side edge can be dimmed an intermediate amount. Pixels on the curved regions proximate to the hinge side edge can be dimmed a relatively higher amount. In some implementations, the amount of dimming can be progressively increased across the curved region from the planar region to the hinge side edge. In some case the progressively dimming can entail uniform rates, such as 15%, 30%, and 45%, for example. In other cases, the rate of progressive dimming can increase, such as 10%, 30%, 70%, for example.

Some configurations can utilize other data when controlling the displays. For instance, the display orientation can be monitored and the progressive dimming can be performed for a sub-range of orientations where users tend to view the displays, such as 100 degrees to 180 degrees, at other orientations (e.g., another sub-range), the dimming may not be performed or different dimming rates can be employed.

The described methods can be performed by the systems and/or devices, such as the control component (524, FIG. 5) described above and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a computing device causes the computing device to perform the method (e.g., computer or device implemented method).

Although techniques, methods, devices, systems, etc., pertaining to progressively dimming abutting curved displays are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a first display rotatably secured to a second display by a hinge assembly, the first and second displays comprising curved regions proximate to the hinge assembly, and a control component communicatively coupled to the first and second displays and configured to progressively reduce pixel intensity of the curved regions toward the hinge assembly.

Another example can include any of the above and/or below examples where the control component comprises a display driver integrated circuit.

Another example can include any of the above and/or below examples where the control component comprises a processor.

Another example can include any of the above and/or below examples where the processor comprises a central processing unit or a graphical processing unit.

Another example can include any of the above and/or below examples where a pixel intensity is reduced on columns of the display.

Another example can include any of the above and/or below examples where columns of the curved regions that are closer to the hinge assembly are reduced to a greater extent than other columns that are farther from the hinge assembly.

Another example can include any of the above and/or below examples where the columns of the curved regions are reduced by a uniformly progressing percentage change depending on distance from the hinge assembly.

Another example can include any of the above and/or below examples where the columns of the curved regions are reduced by a progressively increasing percentage depending on distance from the hinge assembly.

Another example can include any of the above and/or below examples where remaining regions of the displays are planar.

Another example can include any of the above and/or below examples where the control component is configured to progressively reduce pixel intensity of the curved regions at least when the remaining regions of the displays are coplanar.

Another example can include any of the above and/or below examples where the hinge assembly defines first and second parallel hinge axes and the first display rotates around the first hinge axis and the second display rotates around the second hinge axis.

Another example includes a device implemented method comprising receiving content data relating to a pair of displays that are rotatable around a hinge axis and that include curved regions proximate to the hinge axis, and generating a frame rendering for the content data that progressively dims the curved regions of the displays with decreasing distance from hinge axis.

Another example can include any of the above and/or below examples where the receiving content data comprises receiving content data relating to a single image to be collectively presented across the pair of displays.

Another example can include any of the above and/or below examples where the receiving content data comprises receiving content data relating to a first image to be presented on a first display of the pair of displays and a second image to be presented on a second display of the pair of displays.

Another example can include any of the above and/or below examples where the generating comprises generating a frame rendering for the content data that progressively dims pixel intensity and changes pixel color in the curved regions.

Another example can include any of the above and/or below examples where the generating progressively dims columns of the curved regions based on distance from the hinge axis.

Another example can include any of the above and/or below examples and can monitor an orientation of the pair of displays within a range of potential orientations.

Another example can include any of the above and/or below examples where the generating is performed if the orientation is within a first sub-range of the range of orientations and not performed if the orientation is within a second sub-range of the range of orientations.

Another example includes a device comprising a first display having a first planar region and a first curved region, a second display having a second planar region and a second curved region, a hinge assembly rotatably coupling the first curved region and the second curved region, and a processor configured to present images on the displays by driving the first and second curved regions at a lower intensity than the first and second planar regions.

Another example can include any of the above and/or below examples where the processor is configured to access a mapping table that defines the lower intensity based upon a distance from the hinge assembly.

The invention claimed is:

1. A device, comprising:
   a first display rotatably secured to a second display by a hinge assembly, the first and second displays comprising curved regions proximate to the hinge assembly, and,
   a display controller communicatively coupled to the first and second displays and configured to progressively reduce pixel intensity of the curved regions toward the hinge assembly to simulate an appearance of curved pages near a spine of a physical book.

2. The device of claim 1, wherein the display controller comprises a display driver integrated circuit.

3. The device of claim 1, wherein the display controller comprises a processor.

4. The device of claim 3, wherein the processor comprises a central processing unit or a graphical processing unit.

5. The device of claim 1, wherein a pixel intensity is reduced on columns of the first and second displays.

6. The device of claim 5, wherein columns of the curved regions that are closer to the hinge assembly are reduced to a greater extent than other columns that are farther from the hinge assembly.

7. The device of claim 6, wherein the columns of the curved regions are reduced by a uniformly progressing percentage change depending on distance from the hinge assembly.

8. The device of claim 6, wherein the columns of the curved regions are reduced by a progressively increasing percentage depending on distance from the hinge assembly.

9. The device of claim 1, wherein remaining regions of the first and second displays are planar.

10. The device of claim 9, wherein the display controller is configured to progressively reduce pixel intensity of the curved regions at least when the remaining regions of the first and second displays are coplanar.

11. The device of claim 1, wherein the hinge assembly defines first and second parallel hinge axes and the first display rotates around the first hinge axis and the second display rotates around the second hinge axis.

12. A device implemented method, comprising:
    receiving content data relating to a pair of displays that are rotatable around a hinge axis and that include curved regions proximate to the hinge axis; and,
    generating a frame rendering for the content data that progressively dims the curved regions of the pair of displays with decreasing distance from hinge axis to present an appearance of curved pages near a spine of a physical book.

13. The method of claim 12, wherein the receiving content data comprises receiving content data relating to a single image to be collectively presented across the pair of displays.

14. The method of claim 12, wherein the receiving content data comprises receiving content data relating to a first image to be presented on a first display of the pair of displays and a second image to be presented on a second display of the pair of displays.

15. The method of claim 12, wherein the generating comprises generating a frame rendering for the content data that progressively dims pixel intensity and changes pixel color in the curved regions.

16. The method of claim 12, wherein the generating progressively dims columns of the curved regions based on distance from the hinge axis.

17. The method of claim 12, further comprising monitoring an orientation of the pair of displays within a range of potential orientations.

18. The method of claim 17, further comprising performing the generating in response to the orientation being within a first sub-range of the range of orientations and not performing the generating in response to the orientation being within a second sub-range of the range of orientations.

19. A device, comprising:
    a first display having a first planar region and a first curved region;
    a second display having a second planar region and a second curved region;
    a hinge assembly rotatably coupling the first curved region and the second curved region; and,
    a processor configured to present images on the first and second displays by driving the first and second curved regions at a lower intensity than the first and second planar regions in a manner that simulates an appearance of curved pages near a spine of a physical book.

20. The device of claim 19, wherein the processor is configured to access a mapping table that defines the lower intensity based upon a distance from the hinge assembly.

* * * * *